United States Patent
Mangano et al.

(10) Patent No.: US 8,599,982 B2
(45) Date of Patent: Dec. 3, 2013

(54) INTERFACE SYSTEM, AND CORRESPONDING INTEGRATED CIRCUIT AND METHOD

(75) Inventors: Daniele Mangano, Messina (IT); Salvatore Pisasale, Catania (IT)

(73) Assignee: STMicroelectronics S.r.l., Agrate Biranza (IT)

( * ) Notice: Subject to any disclaimer, the term of this patent is extended or adjusted under 35 U.S.C. 154(b) by 0 days.

(21) Appl. No.: 13/309,401

(22) Filed: Dec. 1, 2011

(65) Prior Publication Data
US 2012/0155568 A1 Jun. 21, 2012

(30) Foreign Application Priority Data
Dec. 20, 2010 (IT) .......................... TO2010A001017

(51) Int. Cl.
*H04L 7/00* (2006.01)
*G06F 3/00* (2006.01)
*G06F 13/00* (2006.01)

(52) U.S. Cl.
USPC ........... 375/355; 375/354; 711/159; 711/154; 711/100; 710/52; 710/58; 710/1

(58) Field of Classification Search
USPC ................. 711/159, 154, 100; 710/52, 58, 1; 375/372
See application file for complete search history.

(56) References Cited

U.S. PATENT DOCUMENTS

| 6,263,410 | B1 * | 7/2001 | Kao et al. ...................... 711/156 |
| 2003/0165158 | A1 | 9/2003 | Davies et al. |
| 2004/0128413 | A1 * | 7/2004 | Chelcea et al. ................. 710/52 |
| 2006/0041693 | A1 | 2/2006 | Mangano et al. |
| 2007/0038795 | A1 | 2/2007 | Kadomaru |
| 2008/0123765 | A1 * | 5/2008 | Oh et al. ....................... 375/267 |

OTHER PUBLICATIONS

European Search Report on European Patent Application No. EP 11 19 2731; received Feb. 17, 2012; 5 pps.
European Search Report on Italian Patent Application TO20101017; Jun. 21, 2011; 9 pps.
European Search Report on European Patent Application No. EP 11 19 3208; received Feb. 21, 2012; 6 pps.
European Search Report on Italian Patent Application TO20110050; Jun. 21, 2011; 9 pps.
European Search Report on European Patent Application No. EP 11 19 3192; received Feb. 17, 2012; 5 pps.
European Search Report on Italian Patent Application TO20110049; received Jun. 21, 2011; 8 pps.

* cited by examiner

*Primary Examiner* — Chieh M Fan
*Assistant Examiner* — Michelle M Koeth
(74) *Attorney, Agent, or Firm* — Hogan Lovells US LLP

(57) ABSTRACT

An interface system is used for interfacing a synchronous circuit with an asynchronous circuit, wherein the synchronous circuit generates, in response to a clock signal, a first control signal for indicating that a first data signal contains valid data, and wherein the asynchronous circuit generates, according to an asynchronous communication protocol, a second control signal indicating the state of transmission of a second data signal.

10 Claims, 3 Drawing Sheets a)

PRIOR ART b)

INTERFACE SYSTEM, AND CORRESPONDING INTEGRATED CIRCUIT AND METHOD

RELATED APPLICATION

The present application claims priority of Italian Application No. TO2010A001017 filed Dec. 20, 2010, which is incorporated herein in its entirety by reference.

FIELD OF THE INVENTION

The present invention relates to interfacing systems and methods.

The invention has been developed with particular attention paid to its possible use for interfacing a synchronous-communication interface with an asynchronous-communication interface.

DESCRIPTION OF THE PRIOR ART

The possibility of using interconnection communications within an integrated circuit asynchronous communications becomes increasingly more expedient for mitigating the effects of deep-submicron technologies. In fact, said asynchronous communications present the advantage that the communication is delay-insensitive (DI).

For this purpose, the asynchronous-communication system is frequently required to be interfaced with components comprising a synchronous-communication interface, i.e., a communication interface in which the communication signals are synchronized with a clock signal. For example, this problem frequently exists in systems within an integrated circuit (System-on-Chip or SoC), such as for example circuits to be used for mobile or multimedia applications, in which various Intellectual Property (IP) circuits are connected together to form complex systems. Hence, general asynchronous-communication systems of this sort can include both systems without clock signal and systems of the multi-clock or "globally asynchronous locally synchronous" (GALS) type.

For example, FIG. 1a is a schematic illustration of a possible synchronous-communication timing diagram based upon a two-phase signalling protocol; i.e., the communication is synchronized with a clock signal CLOCK, for example, with the rising edge of the signal CLOCK.

In this case, a first control signal REQ is used for signalling that data are available on a DATA bus (i.e., the data are valid), and a second control signal ACK is used for signalling that the receiver component has been able to sample the data DATA.

In particular, to indicate the fact that no new data are available on the DATA bus, the signal REQ has a first logic value, such as, for example, the logic level '0'; i.e., this condition corresponds to an initial phase referred to as RESET.

Instead, when new data are available on the DATA bus (phase FS1), the transmitter component changes, at an instant $t_1$, the logic value of the signal REQ; for example, it changes the logic level from '0' to '1'.

However, on account of propagation delays, this change is not immediately detectable, and the receiver component can detect said change of the signal REQ only with the next rising edge of the signal CLOCK, i.e., at an instant $t_2$.

Once the change of the signal REQ (phase FA2) has been detected, the receiver component samples the data on the DATA bus and acknowledges that the data have been read; i.e., the receiver component changes at the instant $t_2$ the logic value of the signal ACK, for example changes the logic level from '0' to '1'.

Again, said change is only detectable at the next clock cycle, i.e., at an instant $t_3$.

Consequently, when the transmitter component detects the change of the logic value of the signal ACK at the instant $t_3$, the transmission has gone through successfully and both of the components return to the initial condition, i.e., the RESET condition. However, in the case where a number of data must ideally be transferred consecutively at the maximum speed, the signals REQ and ACK could also remain always high.

Said communication is synchronous, because, for generating and sampling the control signals REQ and ACK, both of the components use the same clock signal, i.e., clock signals that have the same frequency.

Instead, asynchronous circuits are frequently based upon a signalling protocol comprising four "handshaking" phases. In this case, the delay insensitivity is obtained via a particular encoding of the data; namely, the validity of the data can be recognized also from the data themselves.

For example, FIG. 1b shows a communication timing diagram based upon a four-phase signalling protocol, where the signal on a bus ADATA itself signals start of a new communication. In this case, a signal AACK is in any case convenient for signalling the fact that the receiver component has been able to sample the data.

In particular, also in this case, both the transmitter component and the receiver component are in an initial condition referred to as RESET.

However, for signalling the start and end of a communication, the signal on the bus ADATA is used directly. For example, typical four-phase protocols are the "Dual-Rail" or "1-of-N" protocols.

For example, to transmit the logic value '0' (phase FA1), it is possible to transmit actually at an instant $t_4$ the sequence of bits "01" on two different lines. In a substantially similar way, to transmit the logic value '1' it is possible to transmit actually the sequence of bits "10".

The receiver component detects said signal on the bus ADATA and acknowledges that reading has been performed (phase FA2); i.e., the logic value of the signal AACK changes; for example, the logic level changes from '0' to '1'.

Consequently, the transmitter component detects the change of the signal AACK at an instant $t_5$, and the transmitter component signals the end of the communication at an instant $t_6$ (phase FA3). For instance, to signal the end of the communication, the transmitter component can transmit the sequence of bits "00".

Finally, said sequence of bits is detected by the receiver component, and also this returns to the initial condition; i.e., the receiver component again changes the logic value of the signal AACK.

The transmitter component can detect said change at an instant $t_7$ and terminate the communication (phase FA4).

Hence, a four-phase protocol can also be detected in an asynchronous way, i.e., at any moment.

SUMMARY OF THE INVENTION

The object of the invention is to interface a synchronous circuit with an asynchronous circuit.

In fact, the inventors have noted that of considerable importance is the way in which the interface operations are carried out to prevent long delays in the exchange of information.

With a view to achieving the aforesaid object, the subject of the invention is an interface system having the characteristics specified in Claim 1. The invention also regards a corresponding integrated circuit and a corresponding method. Further advantageous characteristics of the invention form the subject of the dependent claims.

The claims form an integral part of the technical teaching provided herein in relation to the invention.

Various embodiments described herein refer to solutions that enable interfacing of a synchronous circuit with an asynchronous circuit.

According to the solution described herein, the interface system is configured for writing the data received from the synchronous circuit in a FIFO (first-in first-out) memory. In particular, said writing is carried out synchronously. Instead, reading of the data from the FIFO memory is carried out in an asynchronous way in response to a control signal received from the asynchronous circuit.

In various embodiments, before the data are saved in the FIFO memory, they are encoded according to the asynchronous-communication protocol used by the asynchronous circuit.

BRIEF DESCRIPTION OF THE DRAWINGS

The invention will now be described purely by way of non-limiting example with reference to the annexed drawings, in which.

DETAILED DESCRIPTION

Illustrated in the ensuing description are various specific details aimed at an in-depth understanding of the embodiments. The embodiments can be provided without one or more of the specific details, or with other methods, components, materials, etc. In other cases, known structures, materials, or operations are not shown or described in detail to prevent various aspects of the embodiments from being obscured.

Reference to "an embodiment" or "one embodiment" in the framework of the present description is meant to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. In addition, particular conformations, structures, or characteristics can be combined in any adequate way in one or more embodiments.

The references used herein are only provided for convenience and hence do not define the sphere of protection or the scope of the embodiments.

As mentioned previously, the object of the invention is to provide an interface system for connecting a synchronous circuit to an asynchronous circuit.

Figure 2:
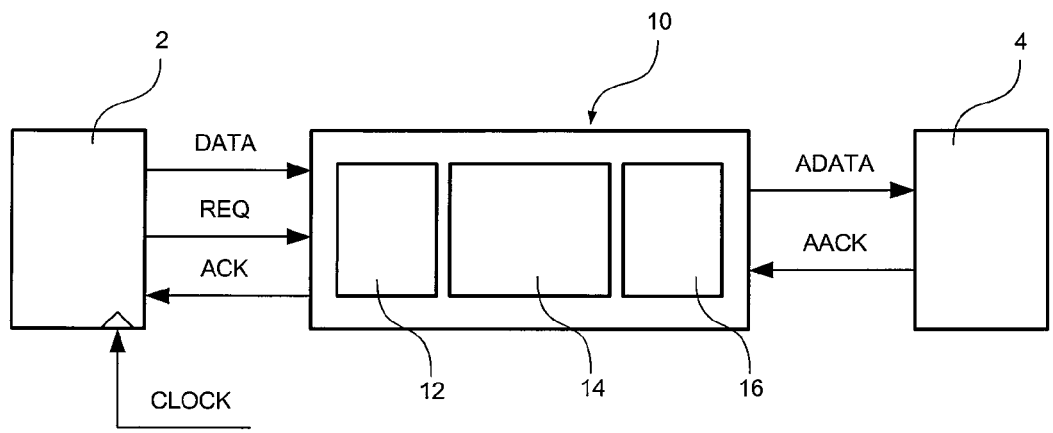
FIG. 2 is a block diagram of a generic interface system.

FIG. 2 shows a possible embodiment of a generic interface system 10 configured for interfacing a synchronous component 2 with an asynchronous system 4.

In particular, in the embodiment considered, the component 2 uses a two-phase synchronous-communication protocol; namely, the circuit 2 comprises a communication interface configured for generating, in response to a clock signal CLOCK, a signal REQ indicating the fact that a signal DATA contains valid data.

In the embodiment considered, the communication interface of the component 2 is configured for receiving at input a signal ACK indicating that the data signal DATA has been sampled.

In the embodiment considered, the system 4 uses, instead, a four-phase asynchronous-communication protocol; namely, the system 4 comprises a communication interface configured for receiving a data signal ADATA, in which the data themselves signal the start and end of a communication.

In the embodiment considered, the communication interface of the system 2 is configured for generating a signal AACK indicating the fact that the data signal ADATA has been sampled.

In the embodiment shown in FIG. 2, in order to interface the synchronous component 2 with the asynchronous system 4, the interface system 10 comprises:

a first sub-circuit 12, configured for receiving the data from the component 2 and for encoding the data according to the specific asynchronous protocol used;

a second sub-circuit 14, configured for converting the two-phase signalling protocol in a four-phase signalling protocol; and a third sub-circuit 16, configured for synchronizing the control signals between the component 2 and the system 4.

In this context, the inventors have noted that of considerable importance is how these operations are carried out to prevent long delays in the communication.

The inventors have also noted that the levels of performance of the interface system 10 can be optimized using a FIFO (first-in first-out) memory for uncoupling the synchronous and asynchronous interfaces. In particular, to provide a self-timed interface system with maximum data transfer, it is necessary for said FIFO memory to be read asynchronously. This means that the asynchronous interface functions in parallel to the synchronous one, preventing possible lags caused by a synchronization of the control signals and/or by the treatment of the four-phase protocol; namely, no synchronous signal is used for direct driving of a signal of the asynchronous interface.

Figure 3:
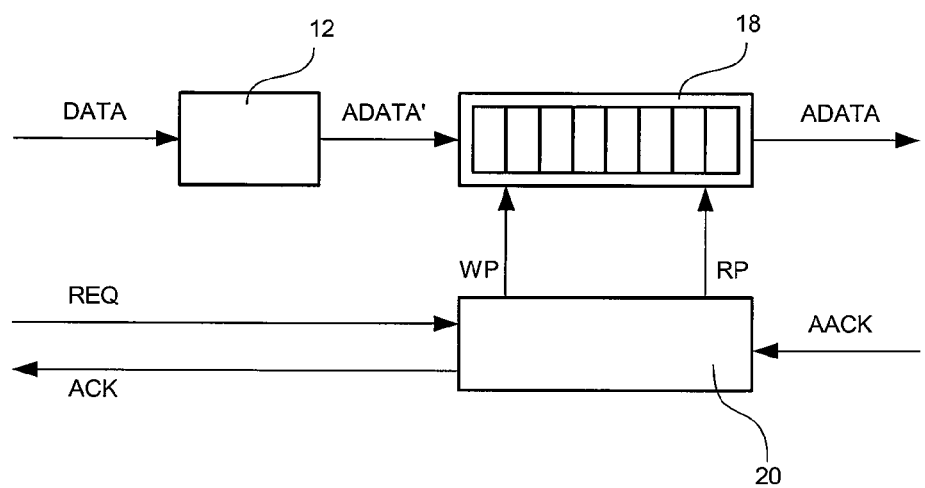
FIG. 3 shows a possible embodiment of an interface system.

FIG. 3 shows a possible embodiment of an interface system 10 of the above sort.

In the embodiment considered, the system 10 receives from the synchronous circuit 2 a data signal DATA and a signal REQ indicating the fact that the data signal DATA contains new data. Preferably, the system 10 transmits also to the synchronous circuit 2 a signal ACK that acknowledges that the data DATA have been read.

Next, the system 10 converts the data received from the circuit 2 and transmits them to the asynchronous system 4. To verify that the data have been received, the system 10 receives from the system 4 an asynchronous read-acknowledge signal AACK.

In particular, to handle communication between the circuits 2 and 4, the system 10 comprises a FIFO memory 18, in which the current write and read locations are indicated respectively via a write pointer WP and a read pointer RP.

Moreover, the system comprises a circuit 12, such as, for example, a combinational circuit, which receives from the circuit 2 the data DATA and supplies at output encoded data ADATA'. In particular, the circuit 12 is configured for encoding the data DATA according to the specific asynchronous protocol used by the circuit 4.

In the embodiment considered, the encoded data ADATA' are then written in the FIFO memory 18. For example, in the embodiment considered, said writing of the data ADATA' in the FIFO memory 18 is controlled via a control circuit 20 that manages the write pointer WP. For example, in the embodiment considered, the write pointer WP is incremented, and the signal ADATA' is saved in the respective memory location when the signal REQ indicates that new data are available. The person skilled in the art will appreciate that it is also possible first to write the data ADATA' in the FIFO memory and only afterwards to increment the write pointer WP.

Figure 1:
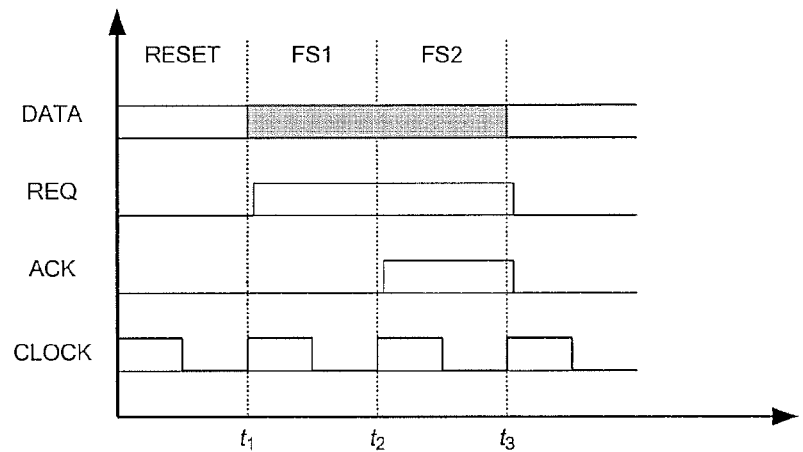
FIG. 1a is a schematic illustration of a possible synchronous-communication timing diagram based upon a two-phase signalling protocol, according to the prior art.
FIG. 1b shows a communication timing diagram based upon a four-phase signalling protocol, according to the prior art.
Figure 1:
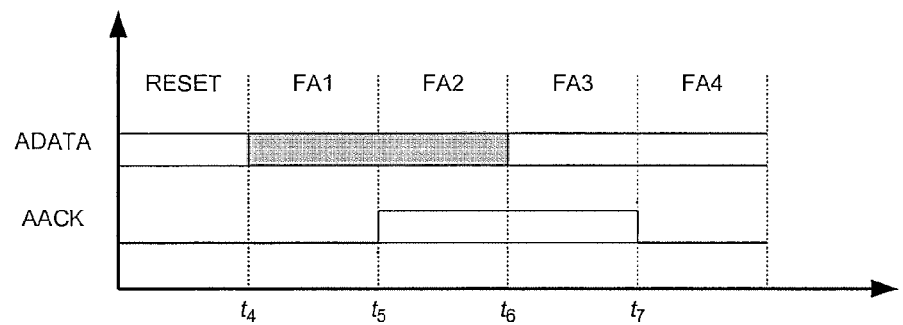

This makes it possible to perform directly phase FA1 of FIG. 1b. In fact, in the case of the first writing of data in the FIFO memory 18, the encoded data ADATA' are already available at output from the FIFO memory 18; i.e., the data are immediately available on the bus ADATA.

In addition, saving of data already encoded in the FIFO memory 18 avoids the need for further control circuits for verifying transmission of the data on the bus ADATA.

In the embodiment considered, passage to phase FA3 of FIG. 1b is carried out asynchronously and is driven directly by the signal AACK. For example, in the embodiment considered, the signal AACK is used for resetting the contents of the memory location being currently read. In particular, in one embodiment, the reset operation is driven directly by the rising edge of the signal AACK. For this purpose, each memory location of the FIFO memory 18 can be made up of a plurality of registers with asynchronous reset.

In general, the control circuit 20 is thus configured for resetting the contents of the memory location indicated by the read pointer RP when a rising edge of the signal AACK is detected, or alternatively a falling edge is detected in the case of an active-low signalling protocol.

Finally, passage to the fourth phase FA4 of FIG. 1b is again driven via the signal AACK. In particular, the system 10 remains waiting for the signal AACK to change again its logic value in order to terminate the communication.

For example, in the embodiment considered, reading of the data ADATA from the FIFO memory 18 is controlled via the control circuit 20 that manages also the read pointer RP. For example, in the embodiment considered, the read pointer RP is incremented when a falling edge of the signal AACK is detected, or alternatively a rising edge is detected in the case of an active-low signalling protocol.

This means, in the case where further data are available in the FIFO memory 18, that said data are immediately set on the bus ADATA. Next, the control circuit 20 once again detects the rising edge and the falling edge of the signal AACK to verify proper reception of the data and to complete transmission.

In one embodiment, in order to prevent possible glitches on the asynchronous interface, the logic circuits used for selecting the memory locations within the FIFO memory use a Gray encoding.

Figure 4:
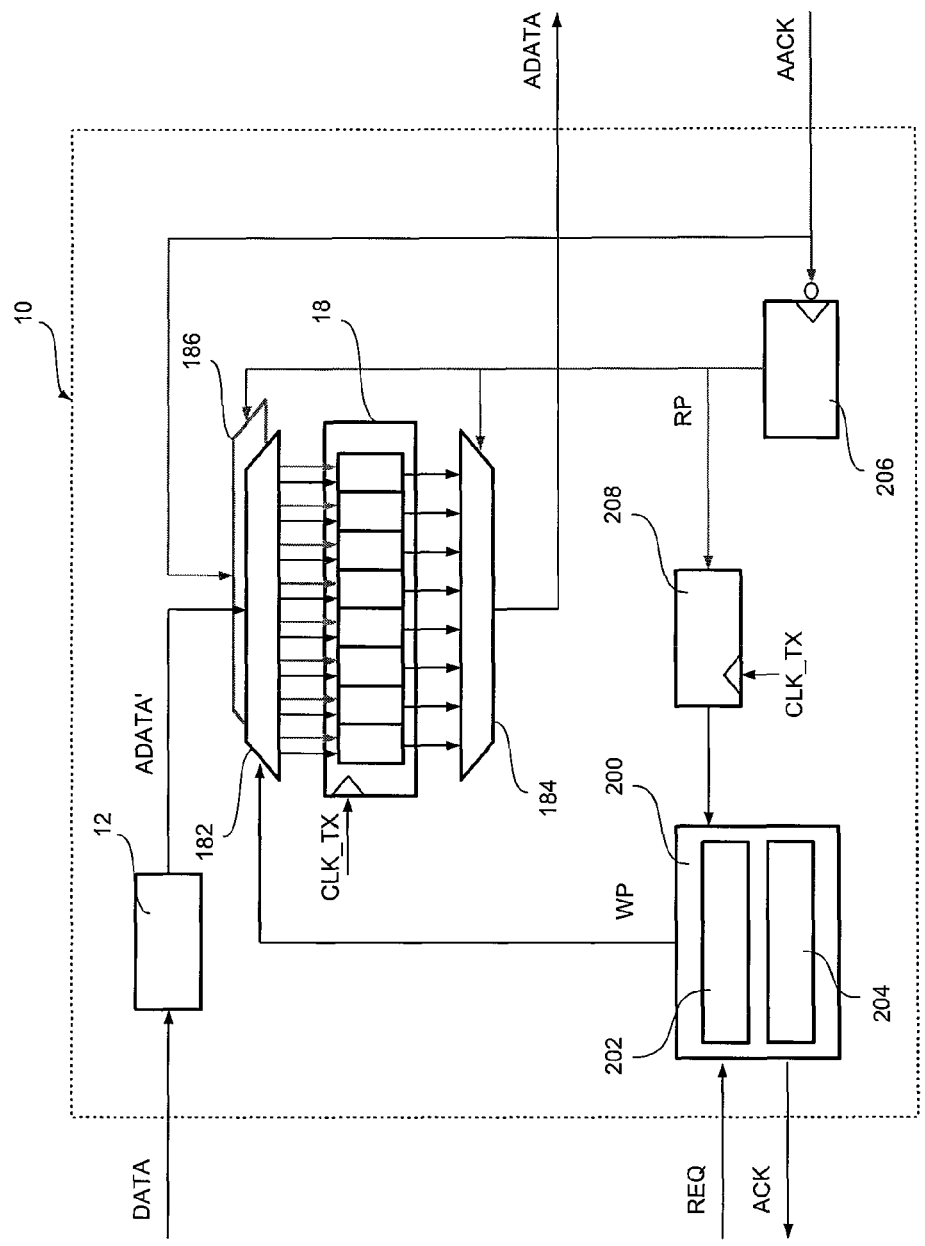
FIG. 4 shows a possible embodiment of the interface system of FIG. 3.

For example, FIG. 4 shows a possible embodiment of the conversion system 10, in which a Gray encoding can also be used.

Also in this case, the system 10 comprises a circuit 12 for implementing a delay-insensitive encoding. In particular, the block 12 receives at input the data generated by the circuit 2 and supplies at output encoded data ADATA'. In general, the solution described here can be applied to any delay-insensitive encoding, and the input data DATA can include both data and control signals, for example of known communication protocols for integrated circuits, such as, for example, the protocols Advanced eXtensible Interface (AXI), STBus, Open Core Protocol International Partnership (OCP-IP).

The system comprises also a FIFO memory 18, in which writing is carried out synchronously with a clock signal CLK_TX, i.e., the clock signal of the synchronous component 2 that transmits data, and reading is carried out asynchronously; i.e., reading is driven principally via the asynchronous signal AACK that acknowledges that the data have been read.

For example, in the embodiment considered, the control circuit of the interface system 10 comprises a first circuit 200 configured for managing the synchronous communication with the component 2 and for generating the write pointer WP of the FIFO memory 18.

For example, in the embodiment considered, the circuit 200 comprises a first block 202 dedicated to generation of the write pointer WP, where the block 202 is configured for incrementing the write pointer WP when the signal REQ indicates that new data are available on the DATA bus. In particular, in the embodiment considered, said operation is synchronized with the operation of the circuit 2; namely, the verification of the logic level of the signal REQ and possible increment of the write pointer WP are carried out at each rising edge (or alternatively at each falling edge) of the signal CLK_TX.

For example, said operation can be implemented via a counter 202 with Gray encoding that is autonomously reset when the value of the counter 202 reaches the total number of memory locations of the FIFO memory 18.

In the embodiment considered, the circuit 200 also comprises a second block 204 dedicated to generation of the signal ACK. In particular, in the embodiment considered, the circuit 204 is configured for acknowledging reception of the data on the DATA bus; i.e., the signal ACK on the synchronous interface is asserted only if the FIFO memory 18 still contains at least one free memory location.

For example, in one embodiment, in order to determine the state of the FIFO memory, the circuit 204 is configured for managing an additional control signal referred to as BUFFER_CREDIT, which is saved in a register.

In particular, the signal BUFFER_CREDIT is initialized at the total number of the memory locations of the FIFO memory 18 and decremented at each writing of data in the FIFO memory 18.

Moreover, the signal BUFFER_CREDIT is updated at certain instants k to take into account any possible reading operations. For example, said updating can be carried out at each reading or periodically, for example, at each clock cycle of the signal CLK_TX, according to the following equation:

$$\text{BUFFER\_CREDIT}_k = \text{BUFFER\_CREDIT}_{k-1} + (RP_k - RP_{k-1}) \tag{1}$$

In the embodiment considered, the control circuit of the interface system 10 also comprises a second circuit 206 configured for managing the asynchronous communication with the circuit 4 and for generating the read pointer RP of the FIFO memory 18.

For example, in the embodiment considered, the circuit 206 is configured for incrementing the read pointer RP when the asynchronous signal AACK indicates that the transmission of the data ADATA is through. For example, for the case shown in FIG. 1b, the read pointer RP is incremented at each falling edge of the signal AACK.

In the embodiment considered, said operation is implemented via a counter 206 with Gray encoding, which is autonomously reset when the value of the counter 206 reaches the total number of memory locations of the FIFO memory 18. In particular, in the embodiment considered, the negated version of the asynchronous signal AACK is used directly as clock signal for said counter 206.

In the embodiment considered, a synchronization circuit 208 is also provided, configured for synchronizing the read pointer RP with the clock signal of the circuit 200, i.e., with the clock signal CLK_TX. For instance, said circuit 208 can be provided via a cascade of two or more flip-flops. In particular, this synchronization circuit ensures that the circuit 200, in particular the circuit 204, uses valid versions of the read pointer RP, i.e., the operation of the circuit 204 is based actually on a synchronized version of the read pointer RP.

Purely by way of illustration, shown in FIG. 4 are also the multiplexers and de-multiplexers of the FIFO memory 18.

In particular, in the embodiment considered, the FIFO memory 18 comprises a de-multiplexer 182 configured for forwarding the current encoded data ADATA' to the memory location selected via the write pointer WP. It is not required that the relation between the value of the write pointer WP and the memory location should be a linear function, but it is sufficient to assign to each value of the pointer WP a specific memory location. For example, the de-multiplexer could also take into account the encoding of the write pointer WP.

In a substantially similar way, the FIFO memory 18 comprises also a multiplexer 184, configured for forwarding the contents of the memory location currently selected via the read pointer RP to the asynchronous circuit 4, i.e., on the bus ADATA.

As mentioned previously, passage from phase FA1 to phase FA3 shown in FIG. 1b may be provided via a reset of the contents of the memory location currently being read. For example, in the embodiment considered, the FIFO memory 18 is provided via a plurality of registers, where each register comprises a reset port. In this case, it is possible to use a further de-multiplexer 186 configured for connecting the asynchronous signal AACK to the reset ports of the registers that correspond to the memory location currently selected via the read pointer RP.

Consequently, when the interface system 10 is initialized, the FIFO memory 18 is empty, and the value of the signal BUFFER_CREDIT corresponds to the total number of the memory locations in the FIFO memory 18.

Moreover, when new data are saved in the FIFO memory, said data are automatically forwarded on the bus ADATA, i.e., the encoded data ADATA' are immediately available on the bus ADATA, because the value of the read pointer RP corresponds initially to the value of the write pointer WP.

Next, when the signal AACK is asserted, i.e., when the rising edge of the signal AACK is detected, the memory location currently selected via the read pointer RP is reset. For example, for a typical asynchronous protocol, the contents of the memory location are erased, and all the lines of the bus ADATA are set to '0'.

Next, when the signal AACK is de-asserted, i.e., when the falling edge of the signal AACK is detected, the read pointer RP is incremented, and the contents of the new memory location are available immediately on the bus ADATA, i.e., in the case where the memory location contains data, said data are set automatically on the bus ADATA and a new transaction starts.

The solution described previously cannot present reset problems since, because once the contents of a memory location have been erased, the read pointer ideally must pass through the chain of synchronization registers. In fact, at least n clock cycles ideally must pass before the location can be written again, where n corresponds to the number of flip-flops in the synchronization chain 208.

In fact, the circuit 200 can save new data in the FIFO memory 18 and verify the state of the FIFO memory also in parallel to the asynchronous transmission described previously. In addition, in the case where the FIFO memory is full, the circuit 200 is configured for inhibiting read acknowledgement; i.e., the synchronous acknowledge signal ACK is not asserted or alternatively is no longer de-asserted.

The solution described herein hence enables maximization of the transfer of data between a synchronous circuit 2 and an asynchronous circuit 4.

In addition, the solution regularizes itself autonomously and is insensitive to any possible variance caused by tolerances or different production processes. For said reason, the solution is also suited to an implementation by means of the so-called "standard cells", a fact that enables shorter design and production times to be achieved.

Finally, the solution can be used for any combination of a two-phase synchronous protocol and a four-phase asynchronous protocol.

Of course, without prejudice to the principle of the invention, the details of implementation and the embodiments may vary widely with respect to what is described and illustrated herein purely by way of example, without thereby departing from the scope of the present invention, as defined in the ensuing claims.

The invention claimed is:

1. An interface system for interfacing a synchronous circuit with an asynchronous circuit, wherein said synchronous circuit generates, in response to a clock signal, a first control signal indicating the fact that a first data signal contains valid data, and wherein said asynchronous circuit generates, according to an asynchronous communication protocol, a second control signal indicating the transmission status of a second data signal, characterized in that the system comprises:
a conversion circuit configured for converting, according to said asynchronous communication protocol, said first data signal into an encoded data signal,
a first-in first-out memory, comprising a plurality of memory locations, wherein the signal currently read from said memory corresponds to said second data signal, and
a control circuit configured for:
writing said encoded data signal in said memory in a synchronous way in response to said clock signal, and
reading said second data signal from said memory in an asynchronous way in response to said second control signal,
wherein said control circuit is configured for writing said encoded data signal in said memory when said first control signal indicates that said first data signal contains valid data,
wherein said control circuit comprises a first counter configured for managing a write pointer indicating the memory location in said memory in which said encoded data signal is written, wherein said first counter is configured for incrementing said write pointer in a synchronous way in response to said clock signal when said first control signal indicates that said first data signal contains valid data,
wherein said control circuit comprises a second counter configured for managing a read pointer indicating the memory location in said memory from which said second data signal is read, wherein said second counter is configured for incrementing said read pointer when said second control signal indicates that said asynchronous circuit can receive new data, and wherein said control circuit is configured for resetting the contents of the memory location indicated via said read pointer when said second control signal indicates that said second data signal has been sampled.

2. The system according to claim 1, wherein each memory location of said memory comprises a plurality of registers with respective reset ports, wherein said second control signal is coupled to the reset ports of the registers that correspond to the memory location indicated via said read pointer.

3. The system according to claim 1, wherein said control circuit is configured for generating a third control signal, and wherein said control circuit is configured for:

setting said third control signal at a first logic value to indicate that said encoded data have been written in said memory; and setting said third control signal at a second logic value to indicate that said memory still comprises at least one free memory location.

4. The system according to claim 1, wherein said conversion circuit is a combinational circuit.

5. An integrated circuit, comprising:

a synchronous circuit, wherein said synchronous circuit generates, in response to a clock signal, a first control signal indicating the fact that a first data signal contains valid data;

an asynchronous circuit, wherein said asynchronous circuit generates, according to an asynchronous communication protocol, a second control signal indicating the transmission status of a second data signal; and an interface system for interfacing said synchronous circuit with said asynchronous circuit according to claim 1.

6. An interface system comprising:

a conversion circuit for converting, according to an asynchronous communication protocol, a first data signal into an encoded data signal, a first-in first-out memory, comprising a plurality of memory locations, wherein the signal currently read from said memory corresponds to a second data signal, and a control circuit for:

writing said encoded data signal in said memory in a synchronous way, and reading said second data signal from said memory in an asynchronous way, wherein said control circuit writes said encoded data signal in said memory when a first control signal indicates that said first data signal contains valid data, wherein said control circuit comprises a first counter for managing a write pointer indicating the memory location in said memory in which said encoded data signal is written, wherein said first counter increments said write pointer in a synchronous way, wherein said control circuit comprises a second counter for managing a read pointer indicating the memory location in said memory from which said second data signal is read, and wherein said control circuit is configured for resetting the contents of the memory location indicated via said read pointer when a second control signal indicates that said second data signal has been sampled.

7. The system according to claim 6, wherein each memory location of said memory comprises a plurality of registers with respective reset ports.

8. The system according to claim 6, wherein said control circuit generates at least one control signal.

9. The system according to claim 6, wherein said conversion circuit comprises a combinational circuit.

10. An integrated circuit, comprising:

a synchronous circuit;

an asynchronous circuit; and an interface system for interfacing said synchronous circuit with said asynchronous circuit according to claim 6.

\* \* \* \* \*